United States Patent
Li et al.

(10) Patent No.: US 10,975,212 B2
(45) Date of Patent: Apr. 13, 2021

(54) VISCOELASTIC AND RETICULATED POLYURETHANE FOAM AND THE PREPARATION THEREOF

(71) Applicant: Covestro Deutschland AG, Leverkusen (DE)

(72) Inventors: Liqiang Li, Shanghai (CN); Qingyun Wang, Shanghai (CN); Yongxing Lin, Shanghai (CN); Zhong Cao, Shanghai (CN); Kehan Xiong, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/580,351

(22) PCT Filed: Jun. 8, 2016

(86) PCT No.: PCT/EP2016/062989
§ 371 (c)(1),
(2) Date: Dec. 7, 2017

(87) PCT Pub. No.: WO2016/198433
PCT Pub. Date: Dec. 15, 2016

(65) Prior Publication Data
US 2018/0155516 A1    Jun. 7, 2018

(30) Foreign Application Priority Data
Jun. 11, 2015 (CN) .......................... 201510340126.8

(51) Int. Cl.
| | | |
|---|---|---|
| C08G 18/18 | (2006.01) | |
| C08G 18/20 | (2006.01) | |
| C08G 18/28 | (2006.01) | |
| C08G 18/32 | (2006.01) | |
| C08G 18/48 | (2006.01) | |
| C08G 18/61 | (2006.01) | |
| C08G 18/66 | (2006.01) | |
| C08G 18/72 | (2006.01) | |
| C08G 18/76 | (2006.01) | |
| C08J 9/00 | (2006.01) | |
| C08L 71/02 | (2006.01) | |

(52) U.S. Cl.
CPC ........ *C08J 9/0061* (2013.01); *C08G 18/1833* (2013.01); *C08G 18/2081* (2013.01); *C08G 18/283* (2013.01); *C08G 18/3206* (2013.01); *C08G 18/4808* (2013.01); *C08G 18/4812* (2013.01); *C08G 18/4825* (2013.01); *C08G 18/4833* (2013.01); *C08G 18/4837* (2013.01); *C08G 18/4845* (2013.01); *C08G 18/61* (2013.01); *C08G 18/6674* (2013.01); *C08G 18/721* (2013.01); *C08G 18/7621* (2013.01); *C08G 18/7664* (2013.01); *C08L 71/02* (2013.01); *C08J 2375/08* (2013.01); *C08L 2205/02* (2013.01); *C08L 2205/03* (2013.01)

(58) Field of Classification Search
CPC ............ C08G 18/4804; C08G 18/4808; C08G 18/4812; C08G 18/4816; C08G 18/4829; C08G 18/4833; C08L 71/02; C08L 2205/03
See application file for complete search history.

(56) References Cited

U.S. PATENT DOCUMENTS

| | | | |
|---|---|---|---|
| 3,492,251 A * | 1/1970 | Gemeinhardt | ..... C08G 18/3878 521/112 |
| 4,259,452 A | 3/1981 | Yukuta et al. | |
| 6,638,986 B2 | 10/2003 | Falke et al. | |
| 6,946,497 B2 | 9/2005 | Yu | |
| 7,022,746 B2 | 4/2006 | Lockwood et al. | |
| 8,357,730 B2 | 1/2013 | Sasaki et al. | |
| 8,362,098 B2 | 1/2013 | Goettke et al. | |
| 8,686,058 B2 | 4/2014 | Obi et al. | |
| 9,255,174 B2 | 2/2016 | Aou et al. | |
| 9,266,996 B2 | 2/2016 | Obi et al. | |
| 2009/0292037 A1 * | 11/2009 | Butler | ................... C08G 18/163 521/170 |
| 2011/0218258 A1 * | 9/2011 | Frericks | ................. C08G 18/36 521/82 |
| 2013/0085200 A1 | 4/2013 | Aou et al. | |
| 2013/0150476 A1 * | 6/2013 | Martin | ....................... C08J 9/00 521/170 |
| 2013/0178548 A1 | 7/2013 | Aou et al. | |
| 2013/0178550 A1 | 7/2013 | Aou et al. | |

(Continued)

FOREIGN PATENT DOCUMENTS

| | | |
|---|---|---|
| CA | 2857609 A1 | 6/2013 |
| CN | 104059244 A | 9/2014 |

OTHER PUBLICATIONS

Houben Weyl; Methoden der Organischen Chemie; vol. XIV/2; Makromolekulare Stoffe; p. 17; George Thieme Verlag; Stuttgart (1963).

(Continued)

*Primary Examiner* — Melissa A Rioja
(74) *Attorney, Agent, or Firm* — N. Denise Brown

(57) ABSTRACT

The present invention provides a polyol composition for preparing a viscoelastic and reticulated polyurethane foam, comprising a first polyether polyol b1), a second polyether polyol b2), a third polyether polyol b3), and a surfactant b6). The present invention also provides a viscoelastic and reticulated polyurethane foam prepared from said polyol composition, wherein the polyurethane foam has a ball rebound rate of less than 15% determined according to GB/T6670-2008.

19 Claims, No Drawings

(56) References Cited

U.S. PATENT DOCUMENTS

2013/0225706 A1     8/2013  Ma et al.
2013/0289150 A1    10/2013  Hager et al.
2015/0284500 A1*   10/2015  Zhao .................. C08G 18/4883
                                                            521/117
2019/0119430 A1*    4/2019  Wei ...................... C08G 18/482

OTHER PUBLICATIONS

Lina, Yao, Factors affecting resilience of polyurethane foam plastics, Key Laboratory of Rubber and Plastic Materials and Engineering, Ministry of Education, Qingdao University of Science and Technology, 266042, Shandong Province.

Oertel, Guenter; Polyurethane; Kunststoff Handbuch 7; 1993; pp. 112-115; Germany.

Air Products; DABCO DC198 Surfactant; Polyurethane Additives Product Bulletin; Feb. 2000; Germany.

Evonik Industries; TEGOSTAB BF 370; Evonik Goldschmidt GmbH; Jan. 2005; Germany.

* cited by examiner

VISCOELASTIC AND RETICULATED POLYURETHANE FOAM AND THE PREPARATION THEREOF

CROSS-REFERENCE TO RELATED APPLICATIONS

This Application is a National Phase Application of PCT/EP2016/062989, filed Jun. 8, 2016, which claims priority to Chinese Application No. 201510340126.8, filed Jun. 11, 2015, each of which being incorporated herein by reference.

TECHNICAL FIELD

The present invention provides a polyol composition for preparing a viscoelastic and reticulated polyurethane foam, comprising a first polyether polyol b1), a second polyether polyol b2), a third polyether polyol b3), and a surfactant b6). The present invention also provides a viscoelastic and reticulated polyurethane foam prepared from said polyol composition, wherein the polyurethane foam has a ball rebound rate of less than 15% determined according to GB/T6670-2008.

BACKGROUND

Viscoelastic and reticulated polyurethane foams are mainly composed of meridian skeleton of cells without or with only a small amount of cell wall membrane. This kind of polyurethane foams has a high air permeability and a larger cell size in addition to the viscoelasticity. Therefore, they are widely used in the fields of furniture, such as sofas, mattresses, pillows, mats, clothing, filters, and industrial packaging.

Viscoelastic and reticulated polyurethane foams are generally prepared by two steps: i) preparing a polyurethane foam; and ii) reticulating the obtained polyurethane foam. The reticulating treatment is generally implemented by chemical etching process or explosive process. For example, the patent document CN104059244A discloses a process for producing a high-crystal-molecule slow-rebound polyurethane, said process is carried out by firstly preparing a viscoelastic polyurethane foam, and then processing in an explosive manner to obtain the slow-rebound polyurethane.

SUMMARY OF THE INVENTION

The present invention provides a polyol composition for preparing a viscoelastic and reticulated polyurethane foam, comprising b1) a first polyether polyol, wherein the first polyether polyol is based on propylene oxide, and has a functionality of 2.6-3.2 and a hydroxyl number of 120-400 mg KOH/g, and the first polyether polyol has a content of 10-70 wt. %, based on total weight of the polyol composition;

b2) a second polyether polyol, wherein the second polyether polyol has 0-20 wt. % of ethylene oxide units based on total weight of the second polyether polyol, and the second polyether polyol has a functionality of 1.8-3.2 and a hydroxyl number of 45-115 mg KOH/g;

b3) a third polyether polyol, wherein the third polyether polyol has 50-100 wt. % of ethylene oxide units based on total weight of the third polyether polyol, and the third polyether polyol has a functionality of 2-8 and a hydroxyl number of 20-240 mg KOH/g; and b6) a surfactant, wherein the surfactant has a content of 0.01-0.50 wt. %, based on total weight of the polyol composition.

In certain embodiments of the invention, the second polyether polyol b2) has a content of 5-60 wt. %, based on total weight of the polyol composition.

In other certain embodiments of the invention, the third polyether polyol b3) has a content of 5-50 wt. %, based on total weight of the polyol composition.

In further certain embodiments of the invention, the polyol composition further comprises:

b4) a monofunctional polyether, wherein the monofunctional polyether has a hydroxyl number of 10-45 mg KOH/g, and a content of 2-25 wt. %, based on total weight of the polyol composition.

In still further certain embodiments of the invention, the polyol composition further comprises:

b5) a fifth polyether polyol, wherein the fifth polyether polyol has 0-30 wt. % of ethylene oxide units based on total weight of the fifth polyether polyol, and a functionality of 2-8 and a hydroxyl number of 10-40 mg KOH/g. Preferably, the fifth polyether polyol has a content of 2-25 wt. %, based on total weight of the polyol composition.

In still further certain embodiments of the invention, the polyol composition further comprises one or more chain extender(s).

The present invention also provides a viscoelastic and reticulated polyurethane foam, prepared from a composition comprising:

A) an isocyanate component, wherein the isocyanate component comprises diphenyl methane diisocyanate or poly(diphenyl methane diisocyanate);

B) an isocyanate-reactive component, wherein the isocyanate-reactive component comprises the above-mentioned polyol composition for preparing a viscoelastic and reticulated polyurethane foam.

In certain embodiments of the invention, the isocyanate component A) further comprises toluene diisocyanate.

In other certain embodiments of the invention, the viscoelastic and reticulated polyurethane foam has a ball rebound rate of less than 15% determined according to GB/T6670-2008.

The present invention also provides a process of preparing a viscoelastic and reticulated polyurethane foam, comprising a step of reacting the components comprising:

A) an isocyanate component, wherein the isocyanate component comprises diphenyl methane diisocyanate or poly(diphenyl methane diisocyanate);

B) an isocyanate-reactive component, wherein the isocyanate-reactive component comprises the above-mentioned polyol composition for preparing a viscoelastic and reticulated polyurethane foam.

In certain embodiments of the invention, the isocyanate component A) further comprises toluene diisocyanate.

In other certain embodiments of the invention, the process doesn't comprise a step of chemical etching or explosive treatment.

DETAILED DESCRIPTION

I. Polyol Composition for Preparing a Viscoelastic and Reticulated Polyurethane Foam The present invention provides a polyol composition for preparing a viscoelastic and reticulated polyurethane foam, wherein said polyol composition can be used to form a reticulated polyurethane foam without reticulating treatment, and the obtained polyurethane foam has suitable cell diameter, high air permeability and good viscoelasticity.

When used in the present invention, the functionality and hydroxyl number mean the average functionality and the average hydroxyl number in each case, unless otherwise indicated. The measurement of hydroxyl number is known for the skilled as such and described, for example, in Houben Weyl, Methoden der Organischen Chemie, vol. XIV/2 Makromolekulare Stoffe, p. 17, Georg Thieme Verlag; Stuttgart 1963, which is incorporated by reference herein in its entirety.

When used in the present invention, the polyether polyol is well-known for the skilled in the art, which can be prepared by known processes. For example, it can be obtained by the reaction of alkylene oxide and an initiator in the presence of a catalyst. The catalyst is, preferably but not limited to, alkali hydroxides, alkali alkoxides, antimony pentachloride, boron fluoride etherate, or a mixture thereof. The alkylene oxide is, preferably but not limited to, tetrahydrofuran, ethylene oxide, propylene oxide, 1,2-butylene oxide, 2,3-butylene oxide, styrene oxide, or a mixture thereof; in particular preferably ethylene oxide and/or propylene oxide. The initiator is, preferably but not limited to, a polyhydroxy or polyamine compound. The polyhydroxy compound is, preferably but not limited to, water, ethylene glycol, 1,2-propanediol, 1,3-propanediol, diethylene glycol, trimethylolpropane, glycerol, bisphenol A, bisphenol S or a mixture thereof. The polyamine compound is, preferably but not limited to, ethylene diamine, propylene diamine, butylene diamine, hexamethylene diamine, diethylenetriamine, tolylenediamine or a mixture thereof. In a preferred embodiment of the present invention, the polyether polyols including the first polyether polyol b1), the second polyether polyol b2), the third polyether polyol b3) and the fifth polyether polyol b5) are based on ethylene oxide and/or propylene oxide.

The first polyether polyol b1) is based on propylene oxide, that means the alkylene oxide used for preparing the first polyether polyol is propylene oxide. Said first polyether polyol has a functionality of 2.6-3.2 and a hydroxyl number of 120-400 mg KOH/g, and the first polyether polyol has a content of 10-70 wt. %, based on total weight of the polyol composition;

The second polyether polyol b2) has 0-20 wt. % of ethylene oxide units, a functionality of 1.8-3.2 and a hydroxyl number of 45-115 mg KOH/g. Preferably, the second polyether polyol b2) has a content of 5-60 wt. %, based on total weight of the polyol composition.

The third polyether polyol b3) has 50-100 wt. % of ethylene oxide units based on total weight of the third polyether polyol, and the third polyether polyol has a functionality of 2-8 and a hydroxyl number of 20-240 mg KOH/g. Preferably, the third polyether polyol b3) has a content of 5-50 wt. %, based on total weight of the polyol composition.

The polyol composition provided according to the invention further comprises the surfactant b6), wherein the surfactant has a content of 0.01-0.50 wt. %, based on total weight of the polyol composition used for preparing a viscoelastic and reticulated polyurethane foam. Said surfactant can be those commonly used in the preparation of polyurethane foams. In a preferred embodiment of the present invention, the surfactant b6) is selected from the group comprising silicones, for example but not limited to Niax L-618 (available from Momentive) and Tegostab B8002 (available from Evonik).

In further certain embodiments of the present invention, the polyol composition used for preparing a viscoelastic and reticulated polyurethane foam further comprises:

b4) a monofunctional polyether, wherein the monofunctional polyether can be obtained by the reaction of a monohydric alcohol selected from C1-C20 aliphatic or aromatic monohydric alcohols and an alkylene oxide selected from ethylene oxide and/or propylene oxide. The monofunctional polyether has a hydroxyl number of 10-45 mg KOH/g, and a content of 2-25 wt. %, based on total weight of the polyol composition used for preparing a viscoelastic and reticulated polyurethane foam.

In further certain embodiments of the present invention, the polyol composition used for preparing a viscoelastic and reticulated polyurethane foam further comprises:

b5) a fifth polyether polyol, wherein the fifth polyether polyol has 0-30 wt. % of ethylene oxide units based on total weight of the fifth polyether polyol, and a functionality of 2-8 and a hydroxyl number of 10-40 mg KOH/g. Preferably, the fifth polyether polyol has a content of 2-25 wt. %, based on total weight of the polyol composition used for preparing a viscoelastic and reticulated polyurethane foam.

In certain embodiments of the present invention, the polyol composition used for preparing a viscoelastic and reticulated polyurethane foam further comprises one or more chain extender(s). Examples of said chain extenders include, but are not limited to ethylene glycol, 1,2- and 1,3-propanediol, 1,3-, 1,4- and 2,3-butanediol, 1,6-hexanediol, 1,8-octanediol, 1,10-decanediol, neopentyl glycol, 1,3- and 1,4-bis(hydroxymethyl) cyclohexane, 2-methyl-1,3-propanediol, diethylene glycol, triethylene glycol, tetraethylene glycol, polyethylene glycol, dipropylene glycol, tripropylene glycol, polypropylene glycol, dibutylene glycol, tributylene glycol, polybutylene glycol, N-methyl-diethanolamine, cyclohexane dimethanol, 2-methyl-1,3-propanediol, 2,2,4-trimethyl-pentane-1,3-diol, 1,2-ethylenediamine, 1,3-propanediamine, 1,4-butanediam ine, hexamethylenediam ine, isophoronediam ine, 1,4-cyclohexanediamine, N,N'-diethyl-phenylenediam ine, 2,4-diam inotoluene, 2,6-diaminotoluene.

In certain embodiments of the present invention, the polyol composition used for preparing a viscoelastic and reticulated polyurethane foam may further comprise a blowing agent, a catalyst and other ingredients.

The blowing agent according to the present invention may be a variety of physical blowing agents or chemical blowing agents. Examples of said blowing agent are, preferably but not limited to, water, halogenated hydrocarbons, hydrocarbons and gases. The halogenated hydrocarbons are preferably, but not limited to, monochlorodifluoromethane, dichloromonofluoromethane, dichlorofluoromethane, trichlorofluoromethane, or a mixture thereof. The hydrocarbons are preferably, but not limited to, butane, pentane, cyclopentane, hexane, cyclohexane, heptane, or a mixture thereof. The gases are preferably, but not limited to, air, $CO_2$ or $N_2$. The blowing agent is particularly preferably water. The amount of the blowing agent is dependent on the desired density of the polyurethane.

The catalyst according to the present invention is preferably, but not limited to, amine catalysts, organic metal catalysts, or a mixture thereof. Said amine catalysts are preferably, but not limited to, triethylamine, tributylamine, triethylenediam ine, N-ethylmorpholine, N, N, N',N'-tetramethyl-ethylene diamine, pentamethyl-diethylene triam ine, N, N-methylaniline, N,N-dimethylaniline, or a mixture thereof. Said organic metal catalysts are preferably, but not limited to, organotin compounds, for example, tin(II)

acetate, tin(II) octoate, tin ethylhexanoate, tin laurate, dibutyltin oxide, dibutyltin dichloride, dibutyltin diacetate, dibutyltin maleate, dioctyltin diacetate and combinations thereof.

II. Reticulated Polyurethane Foam

The present invention also provides a viscoelastic and reticulated polyurethane foam, prepared from a composition comprising:

A) an isocyanate component, wherein the isocyanate component comprises diphenyl methane diisocyanate or poly(diphenyl methane diisocyanate);

B) an isocyanate-reactive component, wherein the isocyanate-reactive component comprises the above-mentioned polyol composition for preparing a viscoelastic and reticulated polyurethane foam.

The isocyanate index of the composition used for preparing said reticulated polyurethane foam is 70-110, preferably 80-105, more preferably 85-100. The isocyanate index (X) is calculated as follows:

$$X (\%)=[(\text{mol of isocyanate groups (NCO groups) in component A}):(\text{mol of isocyanate-reactive groups in component B})] \cdot 100\%$$

In certain embodiments of the present invention, the isocyanate component A) further comprises toluene diisocyanate.

The density of the reticulated polyurethane foam provided according to the invention is 25-100 kg/m$^3$, determined in accordance with GB/T6343-1995.

The number of cells of the reticulated polyurethane foam provided according to the invention is 4-40 cells/25 mm.

The air permeation rate of the reticulated polyurethane foam provided according to the invention is more than 50 L/min, determined according to ASTM D3574-11 Test G with a pressure difference of 20 Pa.

The ball rebound rate of the reticulated polyurethane foam provided according to the invention is less than 15% determined according to GB/T6670-2008.

The recovery time of the reticulated polyurethane foam provided according to the invention is 3-15 seconds determined according to ASTM D3574-11.

The reticulated polyurethane foam according to the present invention can be used e.g. as sofa cushions, mattresses, pillows, mats, shoulder pads for clothing, bra cotton, insoles, shoe tongue, shoe edge, as well as filter materials for dust mask, microphone and automobile exhaust pipes and other equipments and systems, explosion-proof materials for aircraft fuel tanks, ceramic filter material matrix and nickel foam substrate.

III. Process of Preparing a Reticulated Polyurethane Foam

The present invention also provides a process of preparing a viscoelastic and reticulated polyurethane foam, comprising a step of reacting the above-mentioned isocyanate component A) and the above-mentioned isocyanate-reactive component B), wherein a viscoelastic and reticulated polyurethane foam can be prepared according to said process without further reticulating step.

The viscoelastic and reticulated polyurethane foam according to the present invention can be prepared by using methods well known in the art. The methods may include continuous or discontinuous free-foaming block foam method and molded foam method. In one embodiment of the invention, the isocyanate and isocyanate-reactive components are continuously mixed in a foaming machine with the mixing head, and then overflow into the groove on a conveyor. Alternatively, the reaction mixture was applied directly onto the conveyor. When the foam moves downwards along the conveyor, the foam expands to form a continuous block foam, which is cut into segments or blocks with the required length for curing and storage.

After curing for one or more days, these foams can be cut into the desired shapes for end-use.

In a discontinuous process, the reaction components are mixed by a mixing head or in a mixing chamber. Then the reaction mixture was applied to a suitable container, in which the foam expands to form a foam with the container's size.

The viscoelastic and reticulated polyurethane foam according to the present invention may also be prepared by a molded foam method. The molded foam method typically employs one-pot feeding method, wherein the isocyanate component and the isocyanate-reactive component are mixed before injection, the mold is then closed, the foam expands to fill the mold to form a reticulated polyurethane foam with the shape and size of the mold.

EXAMPLES

In this application, all the parts and percentages are based on weight parts and weight percentages, unless otherwise indicated. The starting materials used in this application are described as follows:

Isocyanate 1: toluene diisocyanate with a NCO content of 48.3% and a functionality of 2;

Isocyanate 2: poly(diphenyl methane diisocyanate) with a NCO content of 32-33 wt. % and a functionality of 2.3;

Polyether polyol 1: glycerin initiated polyether polyol with 0% of ethylene oxide, a functionality of 3 and a hydroxyl number of 350 mg KOH/g;

Polyether polyol 2: glycerin initiated polyether polyol with 9% of ethylene oxide, a functionality of 3 and a hydroxyl number of 56 mg KOH/g;

Polyether polyol 3: propylene glycol initiated polyether polyol with 0% of ethylene oxide, a functionality of 2 and a hydroxyl number of 56 mg KOH/g;

Polyether polyol 4: glycerin initiated polyether polyol with 73% of ethylene oxide, a functionality of 3 and a hydroxyl number of 37 mg KOH/g;

Monofunctional polyether 5: with 80% of ethylene oxide, a functionality of 1 and a hydroxyl number of 53 mg KOH/g;

Polyether polyol 6: glycerin initiated polyether polyol with 13% of ethylene oxide, a functionality of 3 and a hydroxyl number of 35 mg KOH/g;

Niax L-618: surfactant, available from Momentive;

Tepostab B8002: surfactant, available from Evonik;

Niax A-1: catalyst, available from Momentive;

Dabco 33LV: catalyst, available from Air Products.

Polyether polyol, blowing agent, surfactant, catalyst, and optional other non-isocyanate additives were added to a 5 Liter plastic beaker. With a stirrer having three impellers (a mixing head having a diameter of about 7 cm), the reaction mixture was mixed at a rotational speed of 2000 rpm for 30 seconds. After adding the isocyanate component, it was quickly mixed for another seven seconds. The mixture was poured into a foaming box, in which it foams freely until the completion of the reaction. The temperature of the starting materials before the reaction was controlled at 23±1° C. The foam was tested in terms of a variety of properties after aging in 72 hours.

Foam density is tested according to GB/T 6343-1995.

Indentation hardness is tested according to GB/T 10807-2006, with a sample size of 380 mm×380 mm×50 mm.

The number of cells is counted pro unit of a straight line distance (25 mm).

Ball rebound rate is tested according to GB/T6670-2008.

Foam recovery time is tested according to ASTM D3574-11 Test M.

Air permeability is tested according to ASTM D3574-11 Test G as follows: in the present application, the air pressure difference on both sides of the foam is kept at 20 Pa, and the air permeability is measured as the amount of air permeated through the foam sample pro unit of time.

Tensile strength is tested according to GB/T 6344-2008.

Elongation at break is tested according to GB/T 6344-2008.

Table 1 indicates the formulations and properties of viscoelastic and reticulated soft polyurethane foams.

TABLE 1 the formulations and properties of viscoelastic and reticulated soft polyurethane foams

| Example | 1 | 2 | 3 | 4 |
|---|---|---|---|---|
| Polyether polyol 1 | 30 | 30 | 30 | 30 |
| Polyether polyol 2 | 30 | 30 | 30 | |
| Polyether polyol 3 | | | | 20 |
| Polyether polyol 4 | 40 | 40 | 30 | 40 |
| monofunctional polyether 5 | | | 10 | |
| Polyether polyol 6 | | | | 10 |
| water | 1.8 | 1.8 | 1.8 | 1.6 |
| Niax L-618 | 0.07 | 0.05 | 0.07 | |
| Tegostab B8002 | | | | 0.25 |
| Niax A-1 | 0.20 | 0.20 | 0.20 | 0.20 |
| Dabco 33LV | 0.14 | 0.14 | 0.14 | 0.14 |
| 1,4-butandiol | | 1.0 | | 1.0 |
| Isocyanate 1 | 22.6 | | | |
| Isocyanate 2 | 22.6 | 54 | 49 | 48 |
| Isocyanate index | 98 | 90 | 90 | 85 |
| Foam performance | | | | |
| density (kg/m³) | 43.0 | 47.8 | 48.1 | 53.8 |
| indentation force deflection 40% (N) | 42 | 57 | 28 | 38 |
| Cell amount (25 mm each) | 10 | 7 | 16 | 25 |
| rebound rate (%) | 5 | 4 | 5 | 9 |
| Foam recovery time (s) | 4.8 | 13.8 | 4.5 | 5.1 |
| air permeation rate (L/min) | 134 | 162 | 131 | 72 |
| Tensile Strength (kPa) | 67 | 55 | 45 | 86 |
| elongation at break (%) | 162 | 138 | 158 | 184 |
| tear strength (N/m) | 340 | 351 | 200 | 263 |

As can be seen from the formulations and properties of the foams in Table 1, the polyurethane foams directly obtained according to the present invention, without reticulating treatment after foaming, have a larger cell diameter, high air permeability and good viscoelasticity.

The invention claimed is:

1. A polyol composition for preparing a viscoelastic and reticulated polyurethane foam, comprising
   b1) a first polyether polyol, wherein the first polyether polyol is based on propylene oxide, and has a functionality of 2.6 to 3.2 and a hydroxyl number of 120 to 400 mgKOH/g, and the first polyether polyol is present in an amount of 10 to 70 wt. %, based on 100% by weight of the polyol composition;
   b2) a second polyether polyol, wherein the second polyether polyol has 0 to 20 wt. % of ethylene oxide units based on 100% by weight of the second polyether polyol, and has a functionality of 1.8 to 3.2 and a hydroxyl number of 45 to 115 mgKOH/g, wherein said second polyether polyol is present in an amount of from 30 to 60 wt. %, based on 100% by weight of the polyol composition;
   b3) a third polyether polyol, wherein the third polyether polyol has 50 to 100 wt. % of ethylene oxide units based on 100% by weight of the third polyether polyol, and has a functionality of 2 to 8 and a hydroxyl number of 20 to 240 mgKOH/g;
   b4) a monofunctional polyether, wherein the monofunctional polyether has a hydroxyl number of 10 to 45 mg KOH/g, and is present in an amount of 2 to 25 wt. %, based on 100% by weight of the polyol composition and
   b6) a surfactant, wherein the surfactant is present in an amount of 0.01 to 0.25 wt. %, based on 100% by weight of the polyol composition.

2. The polyol composition for preparing a viscoelastic and reticulated polyurethane foam according to claim 1, wherein the third polyether polyol b3) is present in an amount of 5 to 50 wt. %, based on 100% by weight of the polyol composition.

3. The polyol composition for preparing a viscoelastic and reticulated polyurethane foam according to claim 1, wherein the polyol composition additionally comprises one or more chain extender(s).

4. A viscoelastic and reticulated polyurethane foam, prepared from a composition comprising:
   A) an isocyanate component, wherein the isocyanate component comprises diphenyl methane diisocyanate or poly(diphenyl methane diisocyanate);
   B) an isocyanate-reactive component, wherein the isocyanate-reactive component comprises the polyol composition for preparing a viscoelastic and reticulated polyurethane foam according to claim 1.

5. The viscoelastic and reticulated polyurethane foam according to claim 4, wherein the isocyanate component A) further comprises toluene diisocyanate.

6. The viscoelastic and reticulated polyurethane foam according to claim 5, wherein the viscoelastic and reticulated polyurethane foam has a ball rebound rate of less than 15% determined according to GB/T6670-2008.

7. A process of preparing a viscoelastic and reticulated polyurethane foam, comprising reacting:
   A) an isocyanate component, wherein the isocyanate component comprises diphenyl methane diisocyanate or poly(diphenyl methane diisocyanate);
   with
   B) an isocyanate-reactive component, wherein the isocyanate-reactive component comprises the polyol composition for preparing a viscoelastic and reticulated polyurethane foam according to claim 1,
   wherein the process is free of a reticulating step.

8. The process of preparing a viscoelastic and reticulated polyurethane foam according to claim 7, wherein the isocyanate component A) further comprises toluene diisocyanate.

9. The process of preparing a viscoelastic and reticulated polyurethane foam according to claim 7, wherein the process is free of chemical etching or explosive treatment.

10. A polyol composition for preparing a viscoelastic and reticulated polyurethane foam comprising
   b1) a first polyether polyol, wherein the first polyether polyol is based on propylene oxide, and has a functionality of 2.6 to 3.2 and a hydroxyl number of 120 to 400 mg KOH/g, and the first polyether polyol is present in an amount of 10 to 70 wt. %, based on 100% by weight of the polyol composition;
   b2) a second polyether polyol, wherein the second polyether polyol has 0 to 20 wt. % of ethylene oxide unites based on 10% by weight of the second polyether polyol, and has a functionality of 1.8 to 3.2 and a hydroxyl number of 45 to 115 mg KOH/g, wherein said second polyether polyol is present in an amount of from 30 to 60 wt. %, based on 100% by weight of the polyol composition;

b3) a third polyether polyol, wherein the third polyether polyol has 50 to 100 wt. % of ethylene oxide unites based on 100% by weight of the third polyether polyol, and has a functionality of 2 to 8 and a hydroxyl number of 20 to 240 mg KOH/g;

b5) a fifth polyether polyol, wherein the fifth polyether polyol has 0 to 30 wt. % of ethylene oxide units based on 100% by weight of the fifth polyether polyol, and a functionality of 2 to 8 and a hydroxyl number of 10 to 40 mg KOH/g; and b6) a surfactant, wherein the surfactant is present in an amount of 0.01 to 0.25 wt. %, based on 100% by weight of the polyol composition.

11. The polyol composition for preparing a viscoelastic and reticulated polyurethane foam according to claim 10, wherein the fifth polyether polyol is present in an amount of 2 to 25 wt. %, based on 100% by weight of the polyol composition.

12. The polyol composition for preparing a viscoelastic and reticulated polyurethane foam according to claim 10, wherein the third polyether polyol b3) is present in an amount of 5 to 50 wt. %, based on 100% by weight of the polyol composition.

13. The polyol composition for preparing a viscoelastic and reticulated polyurethane foam according to claim 10, wherein the polyol composition additionally comprises one or more chain extender(s).

14. A viscoelastic and reticulated polyurethane foam, prepared from a composition comprising:

A) an isocyanate component, wherein the isocyanate component comprises diphenyl methane diisocyanate or poly(diphenyl methane diisocyanate);

B) an isocyanate-reactive component, wherein the isocyanate-reactive component comprises the polyol composition for preparing a viscoelastic and reticulated polyurethane foam according to claim 10.

15. The viscoelastic and reticulated polyurethane foam according to claim 14, wherein the isocyanate component A) further comprises toluene diisocyanate.

16. The viscoelastic and reticulated polyurethane foam according to claim 15, wherein the viscoelastic and reticulated polyurethane foam has a ball rebound rate of less than 15% determined according to GB/T6670-2008.

17. A process of preparing a viscoelastic and reticulated polyurethane foam, comprising reacting:

B) an isocyanate component, wherein the isocyanate component comprises diphenyl methane diisocyanate or poly(diphenyl methane diisocyanate);
with
B) an isocyanate-reactive component, wherein the isocyanate-reactive component comprises the polyol composition for preparing a viscoelastic and reticulated polyurethane foam according to claim 10,
wherein the process is free of a reticulating step.

18. The process of preparing a viscoelastic and reticulated polyurethane foam according to claim 17, wherein the isocyanate component A) further comprises toluene diisocyanate.

19. The process of preparing a viscoelastic and reticulated polyurethane foam according to claim 17, wherein the process is free of chemical etching or explosive treatment.

* * * * *